United States Patent Office 2,754,351
Patented July 10, 1956

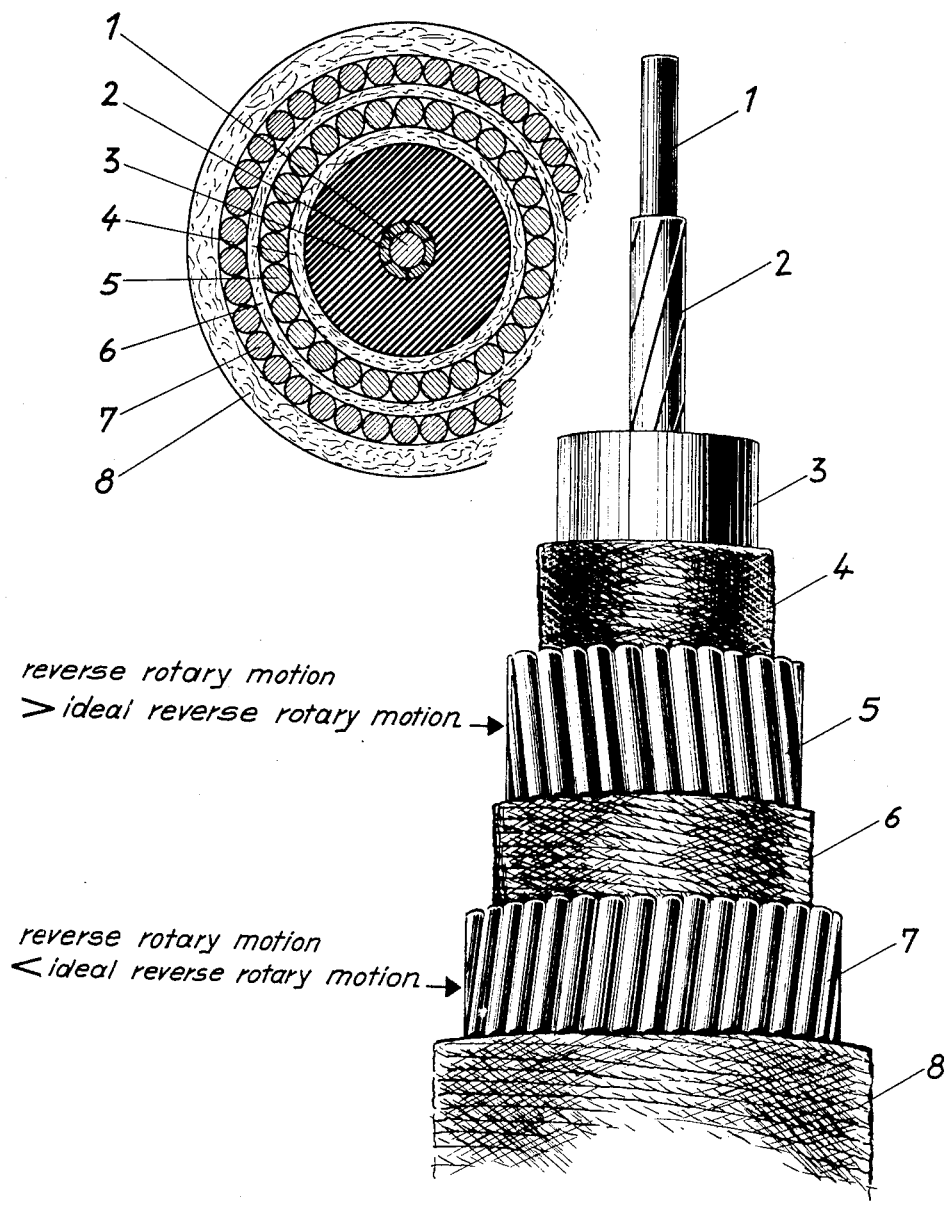

2,754,351

SUBMARINE CABLE

Heinz Horn, Koln-Mulheim, Germany, assignor to Felten & Guilleaume Carlswerk Aktiengesellschaft, Koln-Mulheim, Germany Application October 30, 1951, Serial No. 253,934

Claims priority, application Germany November 16, 1950

2 Claims. (Cl. 174—105)

Cables which are subjected to high tensile stresses in operation or during laying have to be provided with a tension resisting armoring. This is especially the case with deep submarine cables, which are subjected to an unusually high tension load by their own weight during laying or repairs.

When a cable provided with a stranded layer of armoring wires is laid in great depth, the armoring untwists itself owing to the great suspended load which, as has been found in practice may cause the cable to be damaged. It is already known to provide the cable for this reason with two layers of armoring wires which are stranded in opposite directions. The dimensions are thereby so chosen that the torsional moments arising under the tension load in the two layers balance each other. It is true that such cables can be wound on and unwound off reels; however, owing to their great length, submarine cables cannot be accommodated on reels but they have to be run into the tank of the cable laying ship, that is to say be introduced therein in large loops or coils. Now, if it is attempted to thus "run in" a cable provided with two layers of armoring wires substantial difficulties are encountered in practice.

It is to be borne in mind, that when the cable is running into the tank in form of cable loops the cable is turned once around its axis for each loop or coil. This turning round the axis acts on the two layers of the armoring in opposite directions. Assuming, for instance, that the running in of the cable takes place in such a rotary direction that the lower armoring layer is untwisted thereby, then the upper armoring layer is, at the same time, twisted in. Since the two layers of armoring wires are wound tightly on one another, and they cannot move away from each other, the armoring wires offer resistance to the running in of the cable in this direction and they render the cable so rigid, that it is practically impossible to run it in in this rotary direction.

It follows, then, that the cable has to be run in in the reverse rotary direction so that the lower armoring layer is twisted in. The upper armoring layer is thereby untwisted. Thus the two armoring layers tend to move apart so that in this case the running in of the cable does not encounter such a great resistance as in the first case. However, the torsion of the cable around its own axis effected by its being run in causes such internal stresses in the armoring, that after running in the cable does not remain stationary. These stresses act especially strongly in the case of deep sea cables since, owing to the great suspended lengths when the cables are laid and taken up, the tensions that arise are very great, and for this reason steel wires of especially great tensile strength (130 kg./mm.² and more) are used. However, such wires have very great rigidity so that the cables can follow changes of position which are followed by bending or torsional stresses of the armoring wires only with difficulty.

The invention is based on the finding that the stresses of the armoring wires arising during the running in of the cable are substantially reduced by the fact that a suitable reverse rotary motion is imparted to the armoring wires as regards the meaning of this expression see for instance, specification No. 1,773,038. The armoring wires are generally provided on the cable core with a reverse rotary motion of 360° viz. the wires are so stranded that the axes of the running off reels retain their position in space and the reels are turned in this position around the cable. It is known that this kind of mounting of the armoring leads to an excess reverse rotary motion of the wires. The "ideal" reverse rotary motion, viz. the most satisfactory one, required in order that the wires, after being stranded through 360° shall lie again in the original position without any internal twist, is actually smaller than 360° and is dependent on the cosine of the angle of pitch. Thus, according to the invention, in a submarine cable for deep seas comprising an insulated conductor and an armoring surrounding the insulated conductor, the armoring comprising two stranded layers of steel wires of circular cross section and very great tensile strength, stranded in opposite directions, and so dimensioned and stranded around the cable core that when the cable is laid or taken up the torsional moments arising in the two stranded layers owing to its own weight are substantially balanced, has the wires of the lower layer stranded with a greater reverse rotary motion and those of the upper layer stranded with a smaller reverse rotary motion than the ideal back-twist.

Recent tests have shown that one can obtain more accurate angles of reverse rotary motion per pitch if the ratio between the mean diameter of the stranded layer and the diameter of the stranding element as well as the ratio between the pitch and the mean diameter of the stranded layer are taken into consideration in the calculations.

In the armoring according to the invention the angle of reverse rotary motion in the lower stranded layer is made greater and in the upper stranded layer slightly smaller than the "ideal" angle of reverse rotary motion. In this way the lower stranded layer receives a twisting-in torsion moment and the upper stranded layer, an untwisting one, which, since the layers are stranded in opposite directions have a twisting effect on the cable core acting in the same direction. By dimensioning the reverse rotary motion angle according to the invention, the resistance of the cable to allow itself to be run in is reduced, as desired, or entirely removed.

The extent of the excess in reverse rotary motion with respect to the "ideal" reverse rotary motion in the lower stranded layer, and the less reverse rotary motion with respect to the ideal back-twist in the upper stranded layer, are preferably such that the individual stranded layers of the armoring are not subjected to any torsion moment after the running of the cable into the tank of the laying ship.

It has been found that the demands as to the correct adjustment of the required angle of reverse rotary motion are the greater the smaller the diameter of the run-in loop. For this reason, preferably also the smallest loop diameter occurring during the running into the tank of the laying ship is used as the basis for the dimensioning of the angle of reverse rotary motion which may be assumed to be 9–10 feet. Since, in order to maintain the required accuracy, the toothed wheel gears with exchangeable transmission ratios usually employed in stranding machines for the purpose of adjusting the angle of the reverse rotary motion are frequently no longer sufficient, use is preferably made in this case of gears with continuously variable transmission ratio.

The accompanying drawing illustrates by way of example one construction according to the invention, Figure 1 being a cross-section of the cable and Figure 2 an elevation thereof, with parts broken away.

1 is the inner conductor, which is surrounded by a layer 2 of flat wires. 3 is a solid insulation of the conductor preferably consisting of polyethylene. 4 is a layer of jute surrounded by a layer 5 of armoring steel wires, which is further surrounded by a layer 6 of impregnated jute. Over the layer 6 there is provided a second layer 7 of armoring wires, which are stranded in a direction opposite to that of the layer 4. The whole is surrounded by a layer of impregnated jute.

What is claimed is:

1. In a submarine cable for deep seas of the type comprising a conductor, an insulation for the conductor, and an armoring surrounding the insulated conductor comprising two stranded layers of steel wires of circular cross-section and of great tensile strength stranded in opposite lays and which are of such dimensions and so stranded that the torques exerted by the two stranded layers arising due to tensioning during the laying or the taking up of the cable, owing to its weight, are substantially balanced, the improvement that each of the wires of the inner stranded layer has an internal torsional stress and each of the wires of the outer stranded layer has an internal torsional stress, the angular direction of all said torsional stresses being the same with respect to the axis of the cable, whereby the cable may be coiled into the hold of a cable laying ship without difficulty.

2. The submarine cable of claim 1, in which the amount of torsional stress in the wires of the two layers is such that in coiling the cable to a predetermined diameter as required in running the cable into the hold of the cable laying ship, the torsional stress in both layers is substantially removed.

References Cited in the file of this patent

UNITED STATES PATENTS

| | | |
|---|---|---|
| 1,738,234 | Curtis | Dec. 3, 1929 |
| 1,919,509 | Grobl | July 25, 1933 |
| 2,385,241 | White | Sept. 18, 1945 |

FOREIGN PATENTS

| | | |
|---|---|---|
| 5,278 | Great Britain | of 1882 |
| 484,624 | Great Britain | May 9, 1938 |